US007033964B2

(12) United States Patent
Gillette

(10) Patent No.: US 7,033,964 B2
(45) Date of Patent: Apr. 25, 2006

(54) NONWOVEN CAR WASH GLOVE OR MITT

(75) Inventor: S. Mark Gillette, Burlington, NC (US)

(73) Assignee: Precision Fabrics Group, Inc., Greenboro, NC (US)

( * ) Notice: Subject to any disclaimer, the term of this patent is extended or adjusted under 35 U.S.C. 154(b) by 0 days.

(21) Appl. No.: 10/625,608

(22) Filed: Jul. 24, 2003

(65) Prior Publication Data

US 2004/0005831 A1 Jan. 8, 2004

Related U.S. Application Data

(63) Continuation of application No. 09/628,331, filed on Jul. 28, 2000, now abandoned.

(60) Provisional application No. 60/146,139, filed on Jul. 30, 1999.

(51) Int. Cl.
*B32B 27/12* (2006.01)
*B32B 5/02* (2006.01)
*D04H 1/46* (2006.01)

(52) U.S. Cl. ...................... 442/123; 442/121; 442/164; 442/402

(58) Field of Classification Search ................ 442/121, 442/123, 402, 164
See application file for complete search history.

(56) References Cited

U.S. PATENT DOCUMENTS

| | | | | |
|---|---|---|---|---|
| 4,953,250 | A | 9/1990 | Brown | 428/96 |
| 5,470,648 | A | 11/1995 | Pearlman et al. | 442/26 |
| 5,702,992 | A | 12/1997 | Martin et al. | 442/123 |
| 5,756,161 | A | 5/1998 | Taylor | 427/398.1 |
| 5,906,972 | A * | 5/1999 | Gabriel et al. | 510/499 |
| 5,998,355 | A * | 12/1999 | Brumbaugh | 510/424 |
| 6,103,644 | A | 8/2000 | Sheridan | 442/123 |
| 6,362,150 | B1 * | 3/2002 | Lunati | 510/309 |
| 6,827,795 | B1 * | 12/2004 | Kasturi et al. | 134/42 |

OTHER PUBLICATIONS

German Disclosure 24 02 730, CIBA GIEGY AG Basel, Jul. 3, 1975.

* cited by examiner

*Primary Examiner*—Jenna-Leigh Befumo
(74) *Attorney, Agent, or Firm*—Finnegan, Henderson, Farabow, Garrett & Dunner LLP

(57) ABSTRACT

Coating compositions, processes for making them and articles for cleaning composed of non-woven fabrics coated with the novel compositions are described.

15 Claims, No Drawings

NONWOVEN CAR WASH GLOVE OR MITT

This is a continuation of U.S. patent application Ser. No. 09/628,331 filed Jul. 28, 2000, now abandoned, which claims priority to U.S. Provisional Patent Application No. 60/146,139 filed Jul. 30, 1999, both of which are incorporated herein by reference.

BACKGROUND OF THE INVENTION

The present invention reelates to a nonwoven fabric coated with a cleaning composition and articles such as cloths, gloves and mitts made from this fabric. Prior to the present invention, coated fabrics for cleaning have been described in which the coating is applied in a discontinuous fashion to allow for absorbtion of soil and water into the glove or mitt.

For example, U.S. Pat. No. 4,683,001 to Floyd describes a dry and shine polishing cloth composed of a meltblown nonwoven web coated in a discontinuous fashion with polishing chemicals. This product is suitable for drying and polishing lightly soiled surfaces but would not be suitable for cleaning heavily soiled Or gritty surfaces since all of the water and soil being cleaned off of the surface must be absorbed into the glove. Hence, the dry and shine polish cloth would quickly lose its utility due to soil build up.

U.S. Pat. No. 4,953,250 to Brown describes needle punching a two bodied fabric to form a high pile fabric in which the structure of the fabric is carefully controlled to allow a delayed release of the detergent from the inside of the mitt to the outside. Because the emphasis is on delayed release, the detergent is applied on the interior surface as well. The result is that the detergent is inside the mitt next to the user's hand and this is likely to cause skin irritation to the user's hand, especially with prolonged use.

U.S. Pat. No. 5,605,749 to Pike et al. describes spun bonded and thermally bonded fabrics but makes no mention of needle-punched fabrics. Furthermore, the surface-active ingredients are applied to the fabric in small quantities since many of the topically applicable surface active agents are liquids and it is not desirable that they should exude out of the fabric prematurely. This patent also calls for non-woven webs having "autogenous inter-fiber bonds at the crossover contact points of its fibers throughout the web" because fabrics with inter-fiber bonds exhibit the "high resilience, strength and abrasion resistance" necessary for spreading surface active ingredients and buffing or polishing surfaces.

U.S. Pat. No. 5,373,601 to Miller deals with a vehicle washing mitt design that incorporates artificial lamb wool and an abrasive material.

U.S. Pat. No. 4,696,593 to Bayless describes a mitt composed of rubberized canvas and synthetic foam. Bayless's mitt contains a soap reservoir and a hose attachment. The mitt also contains a control device, which controls the use of soap and water. It is evident to even the casual observer that these are not intended to be single use (disposable) products like the fabric or mitt of the present invention. Rather they are objects of complex design and construction.

A number of water and solvent based formulas similar to our formula are described in the trade literature (e.g., Witco formula 636), but in all cases these formulas are designed to be used as liquids. These formulas employ liquid alkanolamides which impart a wet and greasy hand to any fabric to which they are applied.

SUMMARY OF THE INVENTION

Among the objects of the present invention is the creation of a coated fabric capable of cleaning hard surfaces, but which is also dry to the touch. The fabric may be formed into a cleaning article, such as a cloth, glove or mitt, using a simple design and traditional sewing techniques or newer techniques such as thermal or ultrasonic bonding.

A coating compound formulated from specified chemical ingredients and with specified chemical and physical properties is coated onto a needle-punched nonwoven web, preferably to only half of the fabric's thickness to allow for easier thermal or ultrasonic bonding, and dried or allowed to cool (as the formulation dictates) to produce a fabric for cleaning hard surfaces. The fabric is essentially dry to the touch and is designed for cleaning hard surfaces by wetting the hard surface with water, rubbing the fabric, mitt or glove over the surface, thereby emulsifiying the dirt, and then rinsing the soap and dirt off the surface.

The fabric is dry to the touch because chemical compositions which are solids below 30° C. and which form aesthetically pleasing coatings when combined with other cleaning auxiliaries, are employed to coat the article. Examples of these materials include alkanolamides, dialkylammonium chlorides, anionic surfactants, waxes, imidazolines and ethylene oxide/propylene oxide block copolymers.

The present invention also provides a process wherein the alkanolamide, anionic surfactants and/or oxide/propylene oxide block copolymers, together with other cleaning auxiliaries, are stirred together to produce a homogenous slurry which is pumped into a coating trough or other application device such as a slot die, pad, or gravure coater and impregnated into needle-punched fabric. The fabric is dried and cooled. The finished, coated fabric may then be slit, or chopped into squares of rectangles for later finishing unto a cleaning article, such as a, cloth, mitt or glove.

DETAILED DESCRIPTION OF THE INVENTION

The claimed invention is a needlepunched fabric useful in the production of an article such as a cloth, mitt or glove, capable of cleaning an object, which has a continuous coating applied to the outside of the article and which coating is solid at room temperature and dry to the touch. The continuous coating is advantageous because it is simpler to manufacture than the discontinuous coated cloths of the prior art. The cleaning formulas are comprised of chemical compositions which are solids below 30° C., and which form an aesthetically pleasing coating when combined with other cleaning auxiliaries. Examples of these materials include alkanolamides, dialkylammonium chlorides, anionic surfactants, waxes, imidazolines and ethylene oxide/propylene oxide block copolymers. The coating is in the form of a paste or solid to keep the chemicals from exuding out of the fabric.

The claimed invention cleans by means of the interaction of water and surfactants with hard surfaces and does not require a fabric with "resilience, strength and abrasion resistance" for spreading surface active ingredients and for buffing. The cleaning ingredients in the invention dissolve and emulsify oil and dirt and allow for the easy removal of oil and dirt by spraying or wiping off of the surface being cleaned. Also, carefully selected combinations of the claimed cleaning ingredients leave a protective residue on the surface being cleaned. The residue imparts shine and water repellency to many surfaces. The coated fabric of the invention remains useful until all of the chemical is released from the fabric because the emulsified soils on the surface being cleaned are not absorbed into the cloth.

The non-woven fabric is a readily available, easily manufactured, homogeneous needle-punched fabric having a basis weight of about 2.5–10 oz/sq. yard and a mil thickness of 40 to 150 mils and made of 2 to 6 inch staple fibers, having a fine denier from about 3–10. The preferred construction provides maximum surface area for adhesion of the coating composition. The preferred construction has a basis weight of 5–7 oz/sq. yd., a mil thickness between 60 and 80, and is made from a 4 inch, 4 denier staple fiber. Needle punched nonwovens made of acrylic, rayon, cotton, nylon, polypropylene, polyester, or other fabrics which have a melting point above 140° C. are suitable.

The chemical ingredients of the present invention have been selected to have minimal skin irritation, a dry hand (dry to the touch), good foaming characteristics, good cleaning characteristics, efficient transfer onto the surface being cleaned, low solubility to allow for the extended release of ingredients, minimal spotting and streaking, and good storage and shelf stability.

The examples which follow are illustrative of the coating composition, the processes for making it, and the application of the coating to the fabric.

EXAMPLES

Example 1

A coating composition was made using the following ingredients:

| Ingredients | Percent in Formula |
|---|---|
| Water | 60.21 |
| Accosoft 801 (Stepan) | 2.05 |
| Hoechst Wax E Flake | 4.2 |
| Ninol 96-SL (Stepan) | 33.34 |
| Sunburst Fresh Fragrance 970611 (Bush Boake Allen Inc.) | 0.1 |
| Liquitint Blue HP (Miliken Chemical Co.) | 0.1 |

The water was put into a kettle and the temperature was raised to 85° C.; then the other ingredients were added.

The composition was heated until no lumps of wax or surfactant appeared in the mix. The mixture was then cooled while stirring vigorously. As the mix temperature approached 75° C., a light green emulsion formed.

This coating composition was then applied to a 50–90 mils thick needlepunch fabric in a tenter frame where the fabric was run between a vinyl covered sponge and a coating blade which forced the coating down into the surface of the fabric. After the fabric was dried, it was cut and sewn into rectangular pockets, large enough for an adult hand.

Example 2

The following mixture was stirred gently as the ingredients were added.

| Ingredients | Percent in Formula |
|---|---|
| 45° C. Water | 42.7 |
| BioSoft D-62 | 35.7 |
| Ninol 96-SL | 21.4 |
| Liquitint Blue HP | 0.1 |
| Sunburst French Fragrance 970611 | 0.1 |

The Ninol 96-SL was melted before adding it to the mixture. The mixture was stirred vigorously, but not so vigorously as to trap air into the mixture, until thoroughly mixed. The coating composition was applied as in Example 1.

Example 3

The following ingredients were added to a kettle in the order listed while stirring and warmed to around 90° C. The Accosoft 801 and Ninol 96-SL were placed in a hot room prior to making the batch.

| Ingredients | Percent in Formula |
|---|---|
| Accosoft 801 | 20.54 |
| Wacker Silicone Emulsion E60-350 | 1.0 |
| Wacker Silicone Fluid SWS101 100 CS | 1.0 |
| Hoechst Wax E Flake | 15.4 |
| Ninol 96-SL | 61.8 |
| Sunburst Fresh Fragrance 970611 | 0.25 |
| Liquitint Teal (Miliken Chem. Co.) | 0.01 |

The mixture was continually stirred while cooling until the mix was homogeneous with no visible oil globules. The coating composition was then applied as in Example 1.

Example 4

In this Example, the water was heated to 85° C. and the other ingredients were then added.

| Ingredients | Percent in Formula |
|---|---|
| Water | 60.69 |
| Accosoft 801 | 8.2 |
| Wacker Silicone Fluid SWSI 01 100 CS | 0.1 |
| Hoechst Wax E Flake | 6.2 |
| Ninol 96-SL | 24.7 |
| Sunburst Fresh Fragrance 970611 | 0.1 |
| Liquitint Teal | 0.01 |

The composition was heated until no lumps of wax or surfactant appeared in the mix. Cooling was the begun while stirring vigorously. As the mix temperature approached 75° C., a light green-emulsion formed. The coating composition was then applied as in Example 1.

Example 5

In this Example, the water was heated to 85° C. and the other ingredients were then added.

| Ingredients | Percent in Formula |
|---|---|
| Water | 60.3 |
| Accosoft 801 | 2.05 |
| Hoechst Wax E Flake | 4.2 |
| Ninol 96-SL | 33.34 |
| Sunburst Fresh Fragrance 970611 | 0.1 |
| Liquitint Teal | 0.01 |

The composition was heated until no lumps of wax or surfactant appeared in the mix. Cooling was begun while stirring vigorously. As the mix temperature approached 75° C., a light green emulsion formed. The coating composition was applied as in Example 1.

Example 6

In this composition, the water was heated to 85° C. and the other ingredients were then added.

| Ingredients | Percent in Formula |
|---|---|
| Water | 60.21 |
| Accosoft 801 | 2.05 |
| Hoechst Wax E Flake | 4.2 |
| Ninol 96-SL | 33.34 |
| Sunburst Fresh Fragrance 970611 | 0.1 |
| Liquitint Blue HPS | 0.01 |

The composition was then heated until no lumps of wax or surfactant appeared in the mix. Cooling was begun while stirring vigorously. As the mix temperature approached 75° C., a light green emulsion formed. The coating composition was applied as in Example 1.

Example 7

The following compositions were prepared by mixing the ingredients together and gently heating the mixture to melt the solid ingredients so that no lumps of wax or surfactant remain in the mixture. The color and fragrance were added as the mixture cooled.

| Ingredients | Formula 1 | Formula 2 | Formula 3 | Formula 4 | Formula 5 | Formula 6 | Formula 7 |
|---|---|---|---|---|---|---|---|
| Water | 78.195% | 16.3% | — | — | 35.14% | 59.99% | 57.99% |
| Liquitint Teal | 0.025% | — | — | — | — | — | — |
| Tergitol TMN-6 | 0.17% | — | — | — | — | — | — |
| Ninol 96-SL | 14.4% | 48.8% | 66% | 66% | 17.7% | 20% | 20% |
| Hoechst Wax E Flake | 7.21% | 12.2% | 16.5% | 16.5% | | — | — |
| Wacker Silicone Fluid SWS101 100 CS | — | 0.8% | — | — | — | — | — |
| Advanced Polymer APS F-8 | — | 0.8% | — | — | — | — | 2% |
| Genesee Polymer 7104 | — | 0.8% | 1% | 1% | — | — | — |
| Dissolvine Z | — | 4.1% | — | — | — | — | — |
| Accosoft 801 | — | 16.2% | — | — | — | — | — |
| Carspray 300 | — | — | 16.5% | — | — | — | — |
| Accosoft 808 HT | — | — | — | 16.5% | — | — | — |
| Oleic Acid | — | — | — | — | 17% | — | — |
| Sunburst Fresh Fragrance 970611 | — | — | — | — | 0.08% | — | — |
| BioSoft D-62 | — | — | — | — | 30% | 16% | — |
| Liquitint Blue HPS | — | — | — | — | 0.08% | 001% | 0.01% |
| Monawet SNO35 (Mona Industries, Inc.) | — | — | — | — | | 4% | — |
| Dowfax Detergent Solution (Dow Chemical) | | | | | | | 20% |

In the case of formulas containing water or solvent, the viscosity was generally between 250 and 20,000 centapoise so that these materials are suitable for coating using gap coating, scrape coating, gravure coating or slot coating techniques. If a composition does not contain any diluent, the compositions were applied in the melted state and allowed to cool to a solid state.

Example 8

The following compositions were made by mixing the ingredients and heating to above 45° C. until a homogeneous mixture was achieved.

| Ingredients | Formula 1 | Formula 2 | Formula 3 |
|---|---|---|---|
| Liquitint Teal | 0.2% | 0.2% | 0.2% |
| Monamid 150 MW | 33.1% | | |
| Monamid CMA/F | | 33.1% | |
| Monamid LIPA/M | | | 33.1% |
| Carspray 650 (Witco) | 66.3% | 66.3% | 66.3% |
| Sunburst Fresh Fragrance 970611 | 0.4% | 0.4% | 0.4% |

Example 9

| Ingredients | Formula 1 | Instructions |
|---|---|---|
| 85% Acetic Acid | 2.7% | Add |
| Witcamine AL 42-12 | 4.95 | Stir and Add |
| Water | 14.7% | Stir and Add |
| | | The mixture of these three ingredients was heated to at least 70° C. Stirring and heating was continued until the mixture had a water-like viscosity and was clear. The following ingredients were then added and the temperature was allowed to fall to about 45° C. where it was maintained. |
| Ninol 96-SL | 53.75% | Stir and Add |
| Carspray 650 (Witco) | 23.5% | Stir and Add |
| Sunburst Fresh Fragrance 970611 | 0.3% | Stir and Add |
| Liquitint Teal | 0.15% | Stir and Add |

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

I claim:

1. An article for cleaning comprising:

a needle-punched fabric substrate;

an alkanolamide;

an imidazoline; and an anionic surfactant;

wherein at least the alkanolamide and anionic surfactant are solid below 30° C. and are present within the article from a depth of ½ the thickness of the substrate to the outside surface of the article.

2. The article of claim 1 made by a process comprising: continuously applying to a surface of the substrate a coating composition comprising the alkanolamide, imidazoline, anionic surfactant, and at least 40% water.

3. An article for cleaning comprising:

a needle-punched fabric substrate;

an alkanolamide;

an imidazoline; and a dialkylammonium chloride;

wherein at least the alkanolamide and dialkylammonium chloride are solid below 30° C. and are present within the article from a depth of ½ the thickness of the substrate to the outside surface of the article.

4. The article of claim 3 made by a process comprising: continuously applying to a surface of the substrate a coating composition comprising the alkanolamide, imidazoline, dialkylammonium chloride, and at least 40% water.

5. An article for cleaning comprising:

a needle-punched fabric substrate;

an alkanolamide;

an imidazoline; and an ethylene oxide/propylene oxide block copolymer;

wherein at least the alkanolamide and ethylene oxide/propylene oxide block copolymer are solid below 30° C. and are present within the article from a depth of ½ the thickness of the substrate to the outside surface of the article.

6. The article of claim 5 made by a process comprising: continuously applying to a surface of the substrate a coating composition comprising the alkanolamide, imidazoline, ethylene oxide/propylene oxide block copolymer, and at least 40% water.

7. The article of claim 1, 3, or 5, further comprising a wax.

8. The article of claim 1, 3, or 5, wherein said article is a cloth, mitt, or glove.

9. The article of claim 1, 3, or 5, wherein the article leaves a protective residue on a surface cleaned with the article.

10. The article of claim 1, 3, or 5, wherein the substrate has a basis weight ranging from 2.5 to 10 ounces per square yard.

11. The article of claim 10, wherein the substrate has a basis weight ranging from 5 to 7 ounces per square yard.

12. The article of claim 1, 3, or 5, wherein the substrate has a thickness ranging from 40 to 150 mils.

13. The article of claim 12, wherein the substrate has a thickness ranging from 60 to 80 mils.

14. The article of claim 1, 3, or 5, wherein the substrate comprises at least one of the group consisting of: acrylic, rayon, cotton, nylon, polypropylene, and polyester.

15. The article of claim 1, 3, or 5, wherein the substrate comprises a material having a melting point above 140° C.

* * * * *